Patented Jan. 17, 1939

2,144,365

UNITED STATES PATENT OFFICE 2,144,365

VAT DYESTUFFS

Willy Eichholz, Mannheim, Germany, assignor to General Aniline Works, Inc., New York, N. Y., a corporation of Delaware No Drawing. Application January 30, 1937, Serial No. 123,147. In Germany February 6, 1936

3 Claims. (Cl. 260—327)

The present invention relates to a process of producing vat dyestuffs.

In the U. S. Patent 2,025,546 there are described vat dyestuffs and a process for their production according to which 1,2'-dianthraquinonyl-sulphide, the compounds of the nature of 1,2'-dianthraquinonyl-sulphoxide obtainable therefrom by oxidation, or derivatives of the said substances are treated while heating with zinc chloride.

I have now found that the said dyestuffs can be obtained in a specially advantageous manner by causing aluminium in the presence of sulphuric acid to act on the said initial materials instead of zinc chloride. The yield of dyestuffs can be increased by carrying out the reaction in the presence of catalysts, such as nitrosyl-sulphuric acid or the oxides of acid-forming elements of the 5th to the 7th groups of the periodic system or the acids appertaining thereto. For example the oxides and acids of vanadium, chromium, tungsten and manganese are suitable.

The dyestuffs may be purified for example by precipitation in stages from sulphuric acid. The said purification may also be combined with the preparation of the dyestuffs.

The new method of working is distinguished by the fact that it is easier to carry out than that already known, in particular because considerably lower temperatures may be used as for example between 30° and 70° C., even without the supply of heat.

The following examples will further illustrate how the said invention may be carried out in practice but the invention is not restricted to these examples. The parts are by weight.

Example 1

2 parts of aluminium powder are introduced at room temperature during the course of several hours into a solution of 10 parts of 1,2'-dianthraquinonyl-sulphide in 200 parts of sulphuric acid monohydrate, the mixture being stirred at the said temperature until the solution, which originally was blue, has become red. The dyestuff is then precipitated in stages at about 40° C. by means of 200 parts of 62 per cent sulphuric acid. Fine green needles are thus obtained which correspond to the dyestuff obtained according to Example 1 in the said U. S. patent.

If the 1-(4-methylanthraquinonyl)-2'-anthraquinonyl-sulphide having a melting point of from 276° to 278° C., obtainable by the reaction of 1-chlor-4-methylanthraquinone with anthraquinone-2-mercaptan sodium salt in water, be used as initial material, a dyestuff which probably has the following composition

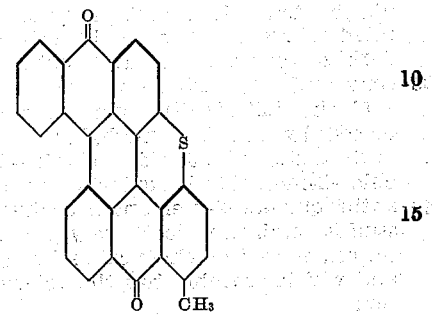

is obtained which is very similar in its properties to the dyestuff specified in the first paragraph of this example.

Example 2

0.5 part of pyrolusite is added to a solution of 10 parts of 1,2'-dianthraquinonyl-sulphide in 200 parts of fuming sulphuric acid containing 1 per cent of sulphur trioxide. 2 parts of aluminium powder are then added during the course of about three hours at about 40° C. The mixture is stirred at about 40° C. until it has become red-brown, water or dilute sulphuric acid then being slowly added until the sulphuric acid content amounts to about 83 percent. The dyestuff which has separated in the form of green needles, is filtered off by suction, washed with 83 per cent sulphuric acid and water and dried.

Example 3

10 parts of 1,2'-dianthraquinonyl-sulphide are dissolved in 100 parts of 96 per cent sulphuric acid, 0.2 part of vanadic acid are added and then, during the course of three hours, 2 parts of aluminium powder are introduced at from 45° to 50° C. As soon as the mixture has assumed a red-brown color, it is worked up in the manner described in Example 2.

If the 1,2'-dianthraquinonyl-sulphide be replaced by 1-anthraquinonyl-2'-(3'-methylanthraquinonyl)-sulphide (obtainable from 2-methylanthraquinone-3-mercaptan sodium salt by reaction with 1-chloranthraquinone in aqueous suspension) a similar dyestuff is obtained which probably has the following composition

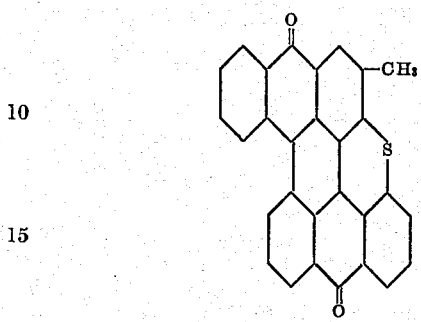

*Example 4*

2 parts of aluminium powder are introduced at from 35° to 40° C. during the course of about five hours into a solution of 10 parts of 1.2'-dianthraquinonyl-sulphide in 100 parts of sulphuric acid monohydrate. After the mixture has assumed a red-brown color, it is introduced into 1000 parts of water. The resulting dark green precipitate is filtered off by suction, washed and dried. In order to remove readily soluble impurities, the dyestuff is first treated at ordinary temperature with nitrobenzene and, after removing adherent nitrobenzene, the remaining dyestuff is precipitated in stages from sulphuric acid. Compact dark green needles are thus obtained which are converted into paste form in the usual way.

If the 1.2'-dianthraquinonyl-sulphide be replaced by the 1-(2-methylanthraquinonyl)-2'-anthraquinonyl-sulphide obtainable from 1-chlor-2-methylanthraquinone by reaction with anthraquinone-2-mercaptan sodium salt, a dyestuff is obtained which is very similar to that described above in a chemical and tinctorial respect and which probably has the following composition

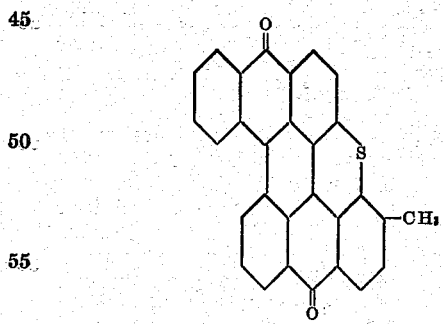

*Example 5*

0.4 part of aluminium powder is introduced during the course of three hours at from 35° to 40° C. into a solution of 2 parts of 2-chlor-3.1'-dianthraquinonyl-sulphide (prepared by the reaction of 2-chloranthraquinone-3-mercaptan sodium salt with 1-chloranthraquinone in an aqueous medium) in 20 parts of sulphuric acid monohydrate, the mixture being stirred for about 15 hours at the said temperature. It thus assumes a dark orange-red coloration. It is poured into water, boiled and the dyestuff which has been precipitated in the form of bluish green flakes is filtered off by suction. It is freed from readily soluble impurities by washing with acetone, dried and precipitated from sulphuric acid. It yields somewhat more bluish dyeings than the dyestuff free from chlorine.

What I claim is:

1. A process of producing vat dyestuffs which comprises heating at a temperature of between 30° and 70° C. a compound corresponding to the general formula

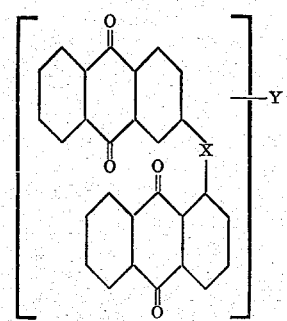

in which X stands for a member selected from the class consisting of —S— and

and Y stands for a substituent selected from the class consisting of halogen and low molecular alkyl, in the presence of sulphuric acid and aluminium, the aluminium being continuously added in an amount sufficient to obtain a green vat dyestuff.

2. A process of producing vat dyestuffs which comprises heating at a temperature of between 30° to 70° C. a compound corresponding to the general formula

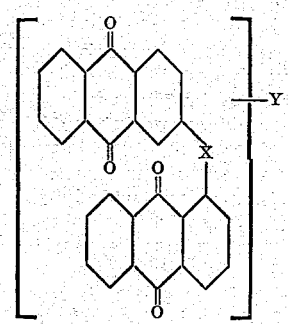

in which X stands for a member selected from the class consisting of —S— and

and Y stands for a substituent selected from the class consisting of halogen and low molecular alkyl, in the presence of sulphuric acid and aluminium, the metal being continuously added in amounts sufficient to obtain a green vat dyestuff.

3. A process of producing vat dyestuffs which comprises heating at a temperature of between 30° to 70° C., in the presence of vanadic acid acting as catalyst, 1.2'-dianthraquinonyl sulphide in the presence of sulphuric acid and adding aluminium in amounts sufficient to obtain a green vat dyestuff.

WILLY EICHHOLZ.